March 18, 1941. H. C. A. POTEZ 2,235,588
TWO STAGE COMPRESSION ARRANGEMENT FOR AIRCRAFT ENGINES
Filed May 9, 1939
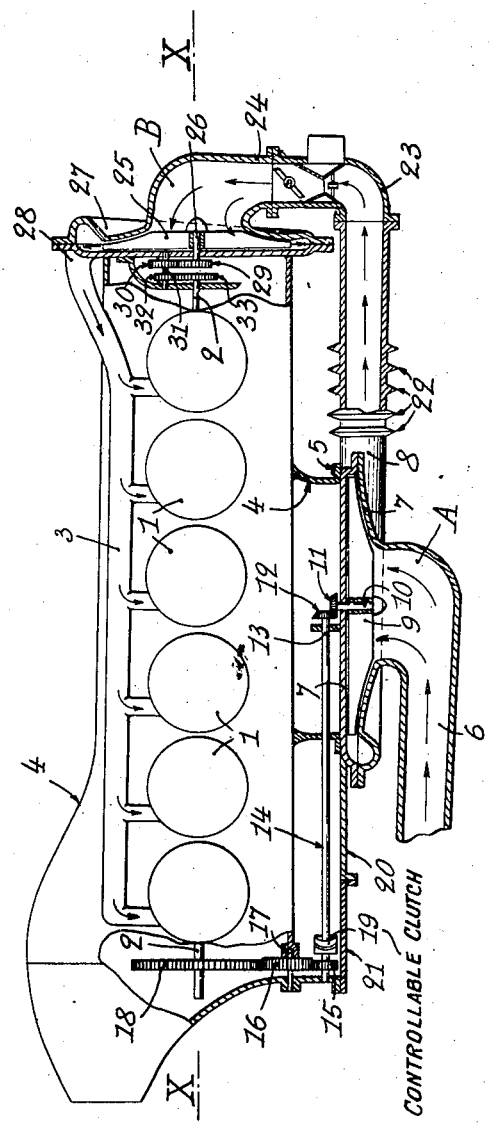
Inventor,
H. C. A. Potez
By: Glascock Downing & Seebold
Attys.

Patented Mar. 18, 1941

2,235,588

UNITED STATES PATENT OFFICE 2,235,588

TWO STAGE COMPRESSION ARRANGEMENT FOR AIRCRAFT ENGINES

Henry Charles Alexandre Potez, Meaulte, France

Application May 9, 1939, Serial No. 272,664
In France May 16, 1938

7 Claims. (Cl. 123—119)

Attempts are made at the present time, in connection with aircraft, to restore the power of internal combustion engines at constantly increasing altitudes, by providing them with compressors. But when use is made of a single-stage compressor, the operation is limited to a certain altitude of restoration, depending upon the maximum ratio of compression allowable in this case. It is found that in practice, this limit can even not be attained.

It has also been proposed to employ compressors having several stages of compression, two stages in practice, which provide for greater ratios of compression, and hence for higher altitudes of restoration.

Such two-stage compressors are usually constructed with two rotors in tandem, disposed at one end of the engine, the carburetter being mounted between the discharge end of the first and the suction end of the second compressor. One of the rotors, usually the first, can be uncoupled when operating on the ground and at low altitudes, in order to avoid an excessive loss of power.

However, this arrangement has great drawbacks. The engine assembly is lengthened to an appreciable degree. The uncoupling of the first rotor is quite difficult to carry out owing to lack of room, and its cooling is defective. The first rotor is difficult of access. The carburetter cannot be readily mounted in the proper manner, the pipes are too short and comprise important bends. Moreover, it is a hard matter to cool the fluid at the outlet of the first rotor, in order to prevent excessive heating and hence an imperfect filling.

The present invention has for its object to provide a two-stage compression arrangement, which obviates the drawbacks above mentioned. The arrangement according to the invention comprises a first centrifugal compressor the axis of which is situated in a plane perpendicular to the axis of the crank-shaft of the engine along which it is mounted, the said compressor being connected in series with a second centrifugal compressor which is secured to the rear end of the engine and the axis of which is parallel with the axis of the crank-shaft.

The first compressor is preferably driven by the front end of the crank-shaft, while the second is driven by the rear end, which driving arrangement permits a better stabilization of the crank-shaft.

According to a further characteristic, the means for driving the rotor of either one of the two compressors comprise a clutch which may be controllable or automatic.

Further characteristics of the invention will be set forth in the following description.

The accompanying drawing, which is given solely by way of example, is a diagrammatic side view, with parts broken away and partial sections, of an engine having two rows of oppositely-situated horizontal cylinders, provided with a compression arrangement in conformity with the invention.

According to this embodiment, the engine is represented diagrammatically by its cylinders 1, its crank-shaft 2, its admission piping 3 and its crank-case 4. At the lower part and externally of the said crank-case 4, i. e. under the engine, there is secured by bolts 5 or otherwise, a centrifugal compressor A comprising a conduit 6 for the inlet of air or suction conduit, a casing 7 and a conduit 8 for discharge of the air. The rotor 9 of this compressor is secured to a shaft 10 situated in a plane perpendicular to the axis X—X of the engine. The said shaft 10 carries a bevel pinion 11 engaging a bevel pinion 12 mounted on the end of a transmission shaft 14 which is parallel with the axis of the engine and rotates in bearings secured on the crank-case of the engine. The transmission shaft 14 carries at its other end a gear-wheel 15 engaging a gear-wheel 16 which is loose on an axle 17 rigidly secured to the crank-case 4. The said gear-wheel 16 meshes with a gear-wheel 18 which is keyed to the forward end of the crank-shaft 2 of the engine. A controllable clutch 19 is mounted at any point of this transmission, for instance adjacent the front end of the shaft 14. An extension 20 of the casing 7 of the compressor encloses the transmission members 11, 12, 14, 15 and 16 and comprises a door 21 providing for a ready access to the transmission and uncoupling mechanism.

The discharge conduit of the compressor A comprises fins 22 or like cooling means, and it is connected with the body 23 of a carubretter of any type, vertical or horizontal. The said carburetter is also connected with the suction conduit 24 of a second centrifugal compressor B comprising a rotor 25 mounted on a shaft 26 which is parallel with the axis X—X of the engine, a casing 27 secured to the crank-case 4 of the engine, and a discharge conduit 28 connected with the admission conduit 3 of the engine. On the shaft 26 of this compressor B is keyed a toothed pinion 29 engaging a pinion 30 keyed to a shaft 31 rotatable in two bearings mounted on the crank-case 4 of the engine. A toothed pinion 32, also keyed to the shaft 31, engages a gear-wheel 33 secured to the crank-shaft of the engine at the rear end thereof.

The operation of the said compression arrangement is as follows: When operating on the ground or at low altitudes, the clutch 19 is actuated in order to disconnect the rotor 9 of the compressor A from the crank-shaft 2 of the engine. The air withdrawn by the compressor B enters through the admission conduit of the compressor A, passes through the rotor 9 of this compressor, and traverses the body 23 of the carburetter, in which it becomes charged with fuel. The mixture of fuel and air then traverses the compressor B whose rotor 25 is driven by the set of gearing 29, 30, 32 and 33 and is discharged into the admission conduit 3 of the engine. It will be noted that in this case the compressor B operates as an ordinary single stage compressor.

Upon reaching a certain altitude, or when in any other case it is necessary to use a greater boost pressure, the control of the clutch 19 is operated in such a way as to drive through the transmission 11, 12, 15, 16 and 18 the rotor of the compressor A from the crank-shaft of the engine.

The air withdrawn through the admission conduit 6 is subjected to a first compression in the compressor A, and then enters the second compressor after it has been cooled in the conduit 8 provided with fins or with another radiator, and has been charged with fuel in the carburetter 23. It is to be noted that the temperature of the air entering the carburetter will still be sufficiently high to prevent frosting of the latter.

The mixture of air and fuel, which is also cooled by the latent heat of vaporization of the fuel drawn forward, undergoes a further compression in the compressor B, and enters the admission conduit 3 of the engine.

The arrangement of the two compressors A and B above described offers the following advantages.

The conduit 8 connecting the discharge end of the compressor A with the suction end of the compressor B has the minimum number of bends, and hence the loss of pressure is greatly reduced. Moreover, it may have an important length, and it can thus be provided with an ample and effective cooling device.

The driving mechanism of the two compressors is easy to realize and is convenient of access. In particular, the drive of the compressor A and the clutch device are readily accessible, as it is simply necessary for the operator, when on the ground, to open the door 21 of the casing 20 which is directly accessible.

Finally, the removal of the carburetter, in its present position, is particularly easy to carry out.

Obviously, the invention is not limited to the embodiment herein described and represented, which is given solely by way of example.

In particular, the compressor A might be mounted above the engine. When the crank-shaft is connected to a reduction gear which is located eccentrically with reference to the axis of the crank-shaft, i. e. on one side of the plane containing the axes of the cylinders, the compressor A is preferably positioned on the other side of said plane.

One or both of the compressors may be provided with driving gears affording different speeds, if desired.

Having now described my invention what I claim as new and desire to secure by Letters Patent is:

1. The combination with an internal combustion engine having at least one row of aligned cylinders, pistons movable in said cylinders and a crankshaft operatively connected to said pistons, of a two-stage compression arrangement comprising a first engine-driven centrifugal compressor whose axis is contained in a plane perpendicular to the axis of said crankshaft intermediate the ends thereof and having an inlet for fresh air and an outlet for compressed air, a second engine-driven centrifugal compressor situated at one end of the row of cylinders with its axis parallel to the axis of said crank-shaft and having an inlet and an outlet, conduit means between the outlet of said first compressor and the inlet of said second compressor and between the outlet of said second compressor and said cylinders, whereby air is withdrawn from the exterior and charged under pressure into said cylinders, and means for charging said cylinders with fuel.

2. The combination with an internal combustion engine having two rows of oppositely disposed aligned cylinders, whose axes are contained in a horizontal plane, pistons movable in said cylinders and a crankshaft operatively connected to said pistons, of a two-stage compression arrangement comprising a first engine-driven centrifugal compressor whose axis is perpendicular to said one plane and having an inlet for fresh air and an outlet for compressed air, a second engine driven centrifugal compressor situated at one end of the rows of cylinders with its axis parallel to the axis of said crank-shaft and having an inlet and an outlet, conduit means between the outlet of said first compressor and the inlet of said second compressor and between the outlet of said second compressor and said cylinders, whereby air is withdrawn from the exterior and charged under pressure into said cylinders, and means for charging said cylinders with fuel.

3. The combination with an internal combustion engine having at least one row of aligned cylinders, pistons movable in said cylinders and a crankshaft operatively connected to said pistons, of a two-stage compression arrangement comprising a first centrifugal compressor whose axis is contained in a plane perpendicular to the axis of said crank-shaft intermediate the ends thereof and having an inlet for fresh air and outlet for compressed air, a second centrifugal compressor situated adjacent one end of said crankshaft with its axis parallel to the axis of the same and having an inlet and an outlet, conduit means between the outlet of said first compressor and the inlet of said second compressor and between the outlet of said second compressor and said cylinders, said second compressor being driven from said one end of said crankshaft and said first compressor being driven from the other end of said crankshaft, and means for charging said cylinders with fuel.

4. The combination with an internal combustion engine having at least one row of aligned cylinders, pistons movable in said cylinders and a crankshaft operatively connected to said pistons, of a two-stage compression arrangement comprising a first engine-driven centrifugal compressor whose axis is contained in a plane perpendicular to the axis of said crankshaft intermediate the ends thereof and having an inlet for fresh air and an outlet for compressed air, a second engine-driven centrifugal compressor situated at one end of the row of cylinders with its axis parallel to the axis of said crankshaft and having an inlet and an outlet, conduit means provided with cooling means between the outlet of said first compressor and between the inlet of said second compressor and other conduit means between the outlet of said second compressor and said cylinders, and means for charging said cylinders with fuel.

5. The combination with an internal combustion engine having at least one row of aligned cylinders, pistons movable in said cylinders and a crankshaft operatively connected to said pistons, of a two-stage compression arrangement comprising a first engine-driven centrifugal compressor whose axis is contained in a plane perpendicular to the axis of said crankshaft intermediate the ends thereof and having an inlet for fresh air and an outlet for compressed air, a second engine-driven centrifugal compressor situated at one end of the row of cylinders with its axis parallel to the axis of said crankshaft and having an inlet and an outlet, conduit means between the outlet of said first compressor and between the inlet of said second compressor, a carburetter inserted in said conduit means for charging the air drawn through said conduit means with fuel and other conduit means between the outlet of said second compressor and said cylinders.

6. The combination with an internal combustion engine having at least one row of aligned cylinders, pistons movable in said cylinders and a crankshaft operatively connected to said pistons, of a two-stage compression arrangement comprising a first centrifugal compressor whose axis is contained in a plane perpendicular to the axis of said crank-shaft intermediate the ends thereof and having an inlet for fresh air and an outlet for compressed air, a second centrifugal compressor situated adjacent one end of said crankshaft with its axis parallel to the axis of the same and having an inlet and an outlet, conduit means between the outlet of said first compressor and the inlet of said second compressor and between the outlet of said second compressor and said cylinders, a driving connection between said second compressor and said one end of said crankshaft and a driving connection between said first compressor and the other end of said crankshaft, a clutch inserted in one driving connection, and means for charging said cylinders with fuel.

7. The combination with an internal combustion engine having at least one row of aligned cylinders, pistons movable in said cylinders and a crankshaft operatively connected to said pistons, of a two-stage compression arrangement comprising a first centrifugal compressor whose axis is contained in a plane perpendicular to the axis of said crank-shaft intermediate the ends thereof and having an inlet for fresh air and an outlet for compressed air, a second centrifugal compressor situated adjacent one end of said crankshaft with its axis parallel to the axis of the same and having an inlet and an outlet, conduit means between the outlet of said first compressor and the inlet of said second compressor and between the outlet of said second compressor and said cylinders, a driving connection between said second compressor and said one end of said crankshaft and a driving connection between said first compressor and the other end of said crankshaft, a controllable clutch inserted in the driving connection of said first compressor adjacent said other end of said crank-shaft where it is easy of access, and means for charging said cylinders with fuel.

HENRY CHARLES ALEXANDRE POTEZ.